United States Patent
Nishimura et al.

(10) Patent No.: US 7,142,859 B2
(45) Date of Patent: Nov. 28, 2006

(54) PROTOCOL TERMINATING METHOD, CONTROL SIGNAL TERMINATING SERVER APPARATUS, AND MOBILE COMMUNICATION SYSTEM

(75) Inventors: Kenji Nishimura, Yokosuka (JP); Jun Kakishima, Yokohama (JP); Shoichi Hirata, Fuchu (JP); Masami Yabusaki, Kashiwa (JP)

(73) Assignee: NTT DoCoMo, Inc., Tokyo (JP)

( * ) Notice: Subject to any disclaimer, the term of this patent is extended or adjusted under 35 U.S.C. 154(b) by 97 days.

(21) Appl. No.: 10/929,121

(22) Filed: Aug. 27, 2004

(65) Prior Publication Data

US 2005/0085227 A1    Apr. 21, 2005

(30) Foreign Application Priority Data

Sep. 10, 2003   (JP) .......................... P2003-318777

(51) Int. Cl.
*H04Q 7/20*    (2006.01)
(52) U.S. Cl. ...................................... 455/442
(58) Field of Classification Search ............. 455/432.1, 455/432.2, 432.3, 442
See application file for complete search history.

(56) References Cited

U.S. PATENT DOCUMENTS

| | | | |
|---|---|---|---|
| 6,594,498 B1 * | 7/2003 | McKenna et al. | 455/517 |
| 6,950,398 B1 * | 9/2005 | Guo et al. | 370/235 |
| 2002/0077149 A1 * | 6/2002 | Tran et al. | 455/560 |

FOREIGN PATENT DOCUMENTS

EP    1207710 A1    5/2002
WO    WO 02/41657 A1    5/2002

OTHER PUBLICATIONS

3GPP TS 25.427 "UTRAN Iub/Iur Interface User Plane Protocol for DCH Data Streams", 1999, 4 pages, no month listed.
3GPP TS 25.321 "MAC Protocol Specification", 1999, 5 pages, no month listed.
3GPP TS 25.322 "RLC Protocol Specification", 1999, 4 pages, no month listed.
3GPP TS 25.323 "Packet Data Convergence Protocol (PDCP) Specification", 1999, 3 pages, no month listed.
3GPP TS 25.331 "RRC Protocol Specification", 1999, 4 pages, no month listed.
3GPP TS 25.423 "UTRAN Iur Interface RNSAP Signaling", 1999, 3 pages, no month listed.
3GPP TS 25.433 "UTRAN Iub Interface NBAP Signaling", 1999, 4 pages, no month listed.
Nishimura, K. et al., "Network Distributed Soft Handover", *The Institute of Electronics, Information and Communication Engineers*, vol. 102, No. 692, Mar. 2003, pp. 323-326.

* cited by examiner

Primary Examiner—Lester G. Kincaid
Assistant Examiner—Gary Au
(74) Attorney, Agent, or Firm—Brinks Hofer Gilson & Lione

(57) ABSTRACT

In a mobile communication network comprised of a plurality of switching devices and a plurality of base stations connected to the switching devices, while a mobile terminal to wirelessly communicate with the base stations is in a communication by a soft handover, a terminal endpoint of a protocol for control of the soft handover is relocated in changing a switching device to another as a branch/combining point of data on a communication route of the communication.

39 Claims, 10 Drawing Sheets

PROTOCOL TERMINATING METHOD, CONTROL SIGNAL TERMINATING SERVER APPARATUS, AND MOBILE COMMUNICATION SYSTEM

BACKGROUND OF THE INVENTION

1. Field of the Invention

The present invention relates to control signal terminating servers and protocol terminating methods in mobile communication networks and, particularly, to a control signal terminating server, a protocol terminating method, and a mobile communication network in a soft handover system without a redundant path.

2. Related Background Art

There is the UMTS (Universal Mobile Telecommunication System) as a conventional mobile communication system standardized by 3GPP ($3^{rd}$ Generation Partnership Project: the standardization project for third-generation (3G) mobile communication systems). The UMTS adopts W-CDMA (Wideband-Code Division Multiple Access) as a radio access technology.

A technical specification group in 3GPP is elaborating UMTS RAN (Radio Access Network).

In the RAN, various radio-related controls, such as soft handover (diversity handover) control, transmit power control, and paging control, are carried out. For implementing these various controls, a variety of protocols are defined in the RAN. A protocol configuration in the RAN is composed of layer 1 (physical layer: L1), layer 2 (data link layer: L2), and layer 3 (network layer: L3) Layer 1 has the handover function, the error correction and detection function, the spectrum spreading modulation/spectrum despreading demodulation function, and the transmit power control function, and in response to a request for transmission of a signal from layer 2, layer 1 supplies the signal to layer 2 through use of a transport channel according to use thereof.

Typical protocols and their controls in the RAN are outlined as follows.

.MAC (Medium Access Control)

MAC is a sublayer of layer 2 and performs multiplexing/demultiplexing of radio layer 2 frames (RLC (Radio Link Control)-PDUs (Protocol Data Units)) onto a transport channel, execution of ciphering/deciphering, measurement of traffic volume and quality, and so on (cf. Non-patent Document 2).

RLC (Radio Link Control)

RLC is a sublayer of a layer 2, and performs segmentation/concatenation/reassembly of layer 3 data, sequence control, retransmission control (ARQ), execution of ciphering/deciphering, and so on (cf. Non-patent Document 3).

.PDCP (Packet Data Convergence Protocol)

PDCP is a protocol of a sublayer of layer 2, and performs appropriate data conversion such as header compression of IP packet, prior to radio transmission (cf. Non-patent Document 4).

.RRC (Radio Resource Control)

RRC is a protocol of layer 3, and performs control of layer 2 protocols, establishment/release of an RRC connection, notification of broadcast information, paging, radio resource control, power control, control of ciphering, and so on (cf. Non-patent Document 5).

.FP (Frame Protocol)

FP performs transfer control of data of wired part, control of channel synchronization and node synchronization for control of downlink data arrival synchronization necessary for soft handover, and so on (cf. Non-patent Document 1).

.RNSAP (RNS Application Part)

RNSAP performs transmission/reception of control signals between SRNC (Serving-RNC) and DRNC (Drift-RNC) (cf. Non-patent Document 6). SRNC is an RNC in a state in which the RNC (Radio Network Controller) is in an RRC connection with a UE (user equipment: mobile unit).

SRNC responds in UTRAN (Universal Terrestrial Radio Access Network), and serves as a connection point to a core network.

DRNC is an RNC to be newly wirelessly connected with a UE when the UE in a connected state is handed over to a cell associated with a different RNS (Radio Network Subsystem). DRNC functions as a switch between SRNC and UE and performs routing of information.

UTRAN is a part consisting of at least one RNC and at least one Node B (radio base station) between Iu interface and Uu interface, in a UMTS network.

The Iu interface is an interface to link the RNC with either a 3GMSC (3G Mobile Switching Center) or a 3GSGSN (3G Serving GPRS Support Node), and the Uu interface is a radio interface between the UTRAN and the UE utilizing CDMA. Node B has a function of providing a physical radio link between the UE and the network.

.NBAP (Node B Application Part)

NBAP performs transmission/reception of control signals between the RNC and the Node B (cf. Non-patent Document 7).

In the UMTS, transactions of user data and transactions of control information are carried out separately from each other.

This user data is called U-Plane (user information transport plane: protocol for control of user data) data (user data). Protocols used in the transactions of U-Plane data are FP, MAC, RLC, and PDCP from the lower level.

The control information is called C-Plane (call control signal plane: protocol for transmission/reception of control information) data (control signal). Protocols used in the transactions of C-Plane data are FP, MAC, RLC, RRC, and, RNSAP and NBAP from the lower level.

(1) U-Plane

FIG. 1 is a block diagram for explaining the U-Plane protocols.

An SRNC 2 is connected to a core network 1, Nodes B 4, 5 are connected to the SRNC 2, and Nodes B 6, 7 to a DRNC 3. The RNCs are, specifically, access routers, and the Nodes B are, specifically, radio base stations.

The SRNC 2, which is an RNC at the time of a start of a communication, and the Node B 5 are connected by FP, and the SRNC 2 and a UE 8 are connected by MAC, RLC, and PDCP. In a case where the UE 8 makes a handover between Nodes B 4, 5 located under the SRNC 2 (Intra-RNC handover), the U-Plane data is directly multicast from the SRNC 2 to each Node B to which the UE 8 is connected.

On the other hand, in a case where the UE 8 makes a handover between Nodes B 5, 6 located under different RNCs 2, 3 (Inter-RNC handover), the U-Plane data is transmitted via SRNC 2 and further via DRNC 3 being a drift RNC, to the destination Node B 6.

In the diversity handover control using the subscriber line extension system in the UMTS, in the case of the Intra-RNC handover, data is multicast from the SRNC 2 to each of Nodes B connected in star topology. For this reason, there arises no problem in the sense of data transmission using an optimal route (shortest route). However, in the case of the Inter-RNC handover, there are a case where the U-Plane data is directly transmitted to Node B 5 under SRNC 2 and a case where the U-Plane data is transmitted from SRNC 2 via DRNC 3 to Node B 6 under DRNC 3.

In the transmission/reception of the U-Plane data, as described above, FP is used between SRNC 2 and Node B 5, between SRNC 2 and DRNC 3, and between DRNC 3 and Node B 6. MAC, RLC, and PDCP are used between SRNC 2 and UE 8.

(2) C-Plane

FIG. 1 is a block diagram for explaining the C-Plane protocols.

The connection relationship of the network is the same as in the U-Plane case. FP is used between SRNC 2 and Node B 5, between SRNC 2 and DRNC 3, and between DRNC 3 and Node B 6. MAC, RLC, and RRC are used between SRNC 2 and UE 8, and RNSAP is used between SRNC 2 and DPNC 3. Furthermore, NBAP is used between SRNC 2 and Node B 5 and between DRNC 3 and Node B 6. The terminal endpoints of the respective protocols on the UMTS architecture are as described above.

As described above, MAC and RLC are common controls used in the C-Plane and in the U-Plane. SRNC 2 is a node serving as a branch/aggregation point of data on the occasion of a soft handover, and it is the RNC having established an RRC connection when the UE 8 started the communication. According to the specification, there exists only one SRNC for one communication and the location thereof is fixed during the soft handover.

[Non-patent Document 1] 3GPP TS 25.427 "UTRAN Iub/Iur interface user plane protocol for DCH data streams"

[Non-patent Document 2] 3GPP TS 25.321 "Medium Access Control (MAC) Protocol Specification"

[Non-patent Document 3] 3GPP TS 25.322 "Radio Link Control (RLC) Protocol Specification"

[Non-patent Document 4] 3GPP TS 25.323 "Packet Data Convergence Protocol (PDCP) protocol"

[Non-patent Document 5] 3GPP TS 25.331 "Radio Resource Control (RRC) Protocol Specification"

[Non-patent Document 6] 3GPP TS 25.423 "UTRAN Iur interface RNSAP signaling"

[Non-patent Document 7] 3GPP TS 25.433 "UTRAN Iub interface NBAP signaling"

SUMMARY OF THE INVENTION

However, the conventional technology described above has the problem that the architecture is incapable of eliminating a redundant routing path possibly appearing in the network during the soft handover.

FIG. 2 is a block diagram showing a conventional network system.

A UE 8 starts a soft handover and moves into the state of FIG. 2; in this case, data is transmitted and received with the SRNC 2 as a branch/combining point, and a routing path (route (I)) at that time contains a partially redundant portion (roundabout transmission/reception route) Q. In this case, if a branch point of data, i.e., SRNC 2 is switched to point A to change the routing path to route (II), the redundant portion Q can be eliminated from the routing path, so as to achieve route optimization.

This is very effective in terms of effective utilization of network resources. However, the conventional technology is based on the specification (architecture) not permitting the movement of the location of SRNC 2 during the communication by soft handover, as described above, and thus includes no definition about movement of terminal endpoints of protocols. Therefore, the conventional technology had the problem that it was infeasible to implement the optimization of the routing path as described above.

Namely, SRNC 2 is continuously used and thus, in the conventional mobile communication network composed of a plurality of switching devices (routers and access routers) and a plurality of radio base stations Nodes B (BSs) connected to the switching devices (access routers), while a mobile terminal UE (MN) to communicate with the radio base stations is in a communication by a soft handover, the terminal endpoints of the protocols for the soft handover control are not relocated in changing the switching device to another as a branch/combining point of data on a communication route of the communication.

The present invention has been accomplished in view of the problem as described above, and an object of the invention is to provide a protocol terminating method, a control signal terminating server apparatus, and a mobile communication network in an architecture to enable movement of a branch point of data in order to eliminate a redundant routing path in a soft handover (including a reference for the relocation of the terminal endpoints of the protocols).

In order to solve the above problem, a protocol terminating method of the present invention is a protocol terminating method in a mobile communication network comprising a plurality of switching devices and a plurality of base stations connected to the switching devices, wherein, while a mobile terminal to wirelessly communicate with the base stations is in a communication by a soft handover, a terminal endpoint of a protocol for control of the soft handover is relocated in changing a switching device to another as a branch/combining point of data on a communication route of the communication.

This makes it feasible to eliminate a redundant routing path in the network occurring with movement of the mobile terminal, without trouble in the communication.

The present invention is also characterized by comprising a control signal terminating server apparatus for terminating protocols for transmission/reception of control signals for the soft handover control, in the protocol terminating method.

With installation of this server apparatus, it becomes feasible to independently carry out the control of routing of user data and the control of routing of control signals, and to move a control point (switching device as a branch/combining point) without trouble in communication.

The protocol terminating method of the present invention is also characterized in that, where it is noted as to protocols for control of user data that a switching device at an uppermost point among the switching devices as branch/combining points on a routing path of the user data is defined as an upper MP(U) and that each switching device as a branch/combining point except for the upper MP(U) is defined as a lower MP(U), the protocols for the control of the user data are terminated as follows: a frame protocol is terminated between the upper MP (U) and a base station, between the upper MP(U) and a lower MP(U), between the lower MP(U) and another lower MP(U), and between the lower MP(U) and the base station; each of protocols of MAC (Medium Access Control), RLC (Radio Link Control), and PDCP (Packet Data Convergence Protocol) is terminated between the mobile terminal and the upper MP (U).

This makes it feasible to implement the switching of the routing path of the user data in conjunction with movement of the control point, without trouble in the communication.

The protocol terminating method of the present invention is also characterized in that the mobile communication network comprises a control signal terminating server apparatus for terminating protocols for transmission/reception of control signals for the control of the soft handover and in that, where it is noted as to the protocols for transmission/reception of the control signals that a switching device at an uppermost point among branch/combining points on a routing path of the control signals is defined as an upper MP(C) and that each switching device as a branch/combining point except for the upper MP(C) is defined as a lower MP(C), the protocols for the transmission/reception of the control signals are terminated as follows: the frame protocol is terminated between the upper MP(C) and the base station, between the upper MP(C) and a lower MP(C), between the lower MP(C) and another lower MP(C), and between the lower MP(C) and the base station; each of the protocols of MAC and RLC is terminated between the mobile terminal and the upper MP(C); RRC (Radio Resource Control) is terminated in a section from the mobile terminal via the upper MP(C) to the control signal terminating server apparatus; RNSAP (RNS Application Part) is terminated between the upper MP(C) and the lower MP(C), between the lower MP(C) and another lower MP(C), between the upper MP(U) and the lower MP(U), and between the lower MP(U) and another lower MP(U); NBAP (Node B Application Part) is terminated between the upper MP(C) and the base station, between the lower MP(C) and the base station, between the upper MP(U) and the base station, and between the lower MP(U) and the base station.

This makes it feasible to perform the switching of the routing path of the control signals in conjunction with movement of the control point, without trouble in the communication.

The protocol terminating method of the present invention is also characterized in that a section between the control signal terminating server and the upper MP(C) and a section between the control signal terminating server and the upper MP(U) are terminated by a new communication protocol. This makes it feasible to perform the routing control of user data and the routing control of control signals independently of each other.

A mobile communication network of the present invention is a mobile communication network comprising a plurality of switching devices and a plurality of base stations connected to the switching devices, the mobile communication network comprising: changing means for, while a mobile terminal to wirelessly communicate with the base stations is in a communication by a soft handover, changing a switching device to another as a branch/combining point of data on a communication route of the communication; and protocol terminal endpoint relocating means for relocating a terminal point of a protocol for control of the soft handover, in the changing by the changing means.

In this case, the protocol terminal endpoint relocating means relocates the terminal endpoint of the protocol whereby the communication can be maintained in a good condition even if the changing means changes the branch/combining point to another so as to eliminate a redundant routing path.

The conditions for the relocation of the terminal endpoint of the protocol by the protocol relocating means are as described above, whereby the switching of the routing path for the control signals in conjunction with movement of the control point can be performed without trouble in the communication.

As described above, the present invention involves the process of relocating the terminal endpoints of the protocols whereby, while the mobile terminal is in a communication in a soft handover state, the branch/combining point on the routing path of data can be moved while maintaining the normal communication. This makes it feasible to eliminate the redundancy of the routing path in conjunction with movement of the mobile terminal.

The present invention is applicable to the control signal terminating servers and the protocol terminating methods in the mobile communication networks and, particularly, to the control signal terminating servers, protocol terminating methods, and mobile communication networks in the soft handover system without occurrence of a redundant path.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is an illustration showing terminal endpoints of C-Plane protocols in an RAN of the UMTS.

DESCRIPTION OF THE PREFERRED EMBODIMENTS

Embodiments of the present invention will be described below in detail with reference to the drawings. The same elements will be denoted by the same reference symbols, without redundant description.

Figure 1:
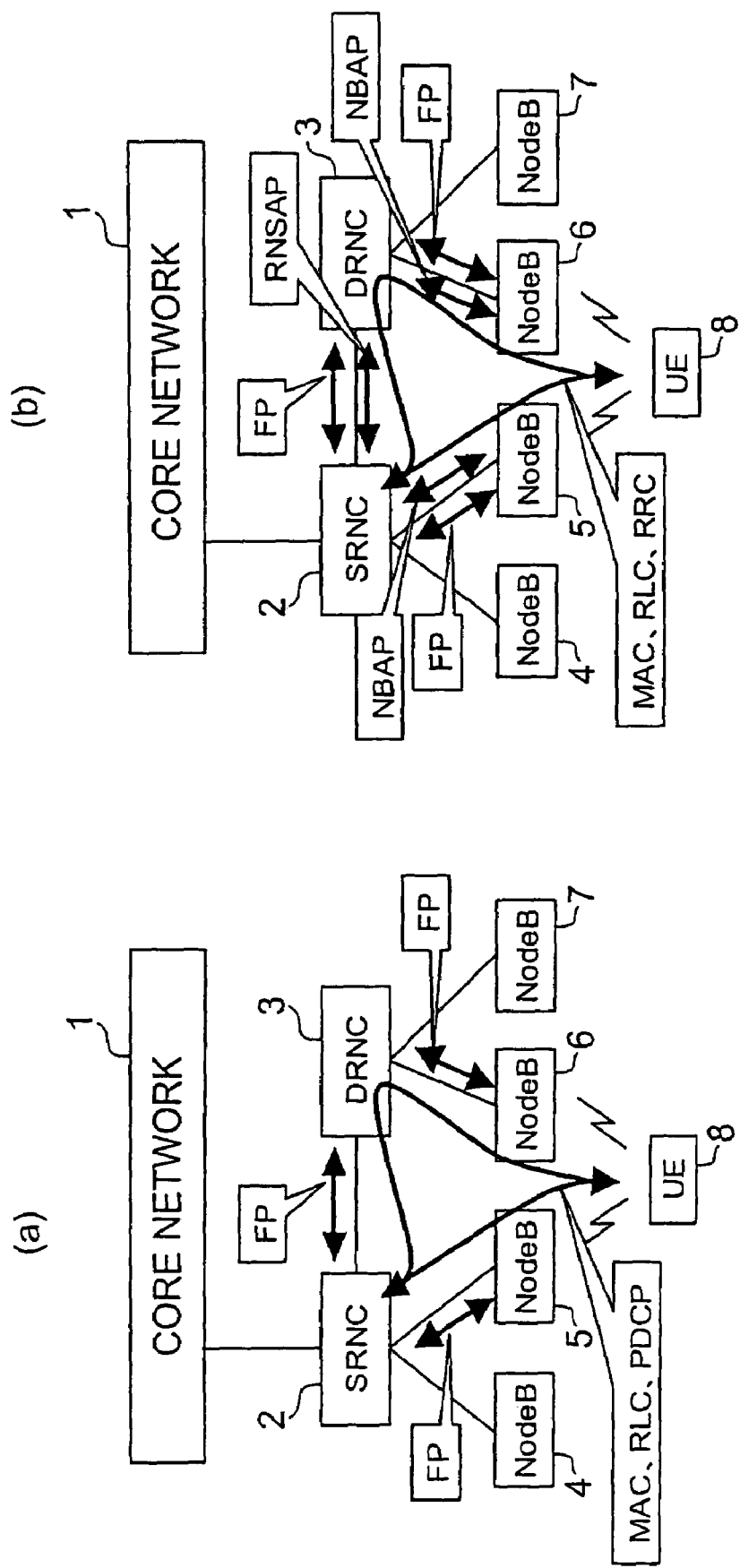
FIG. 1 is an illustration showing terminal endpoints of U-Plane protocols in an RAN of the UMTS.
Figure 2:
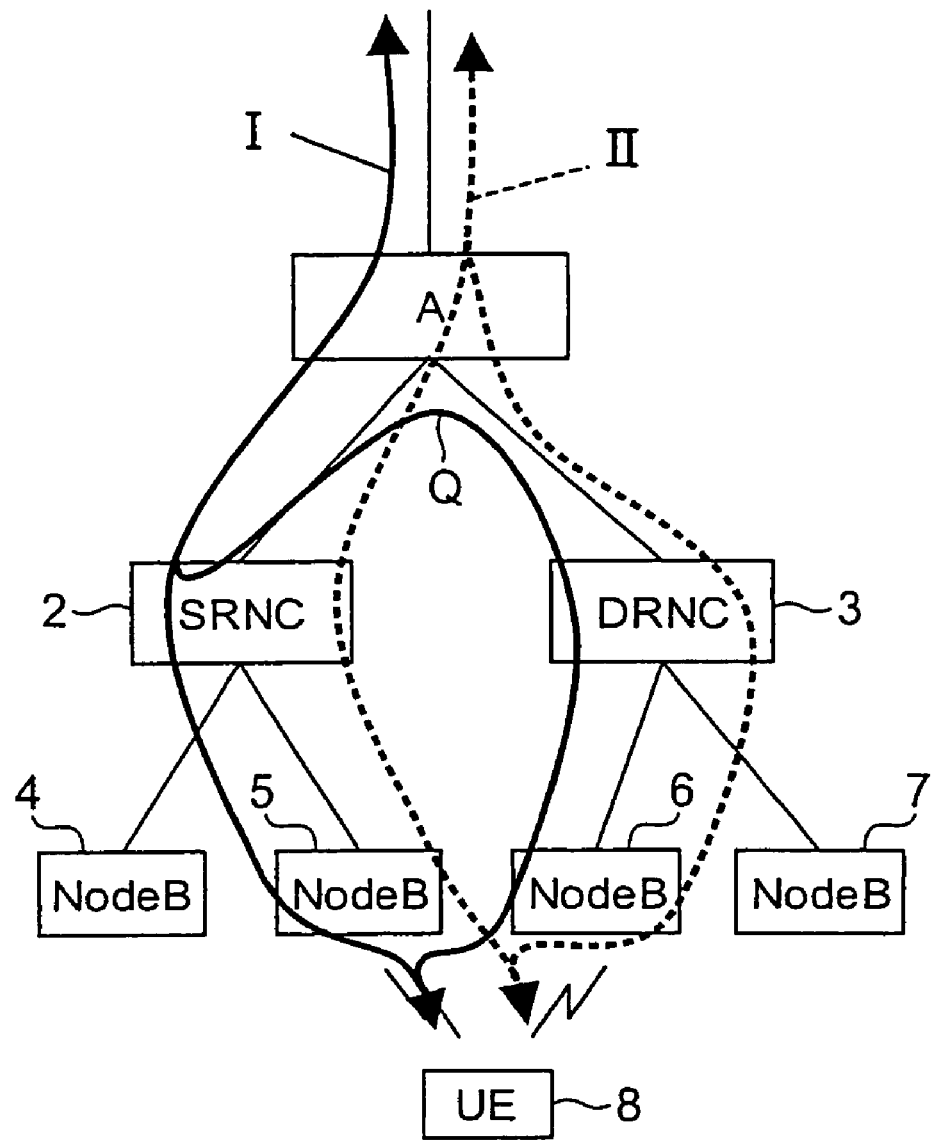
FIG. 2 is an illustration for explaining the problem in the UMTS as a conventional method.
Figure 3:
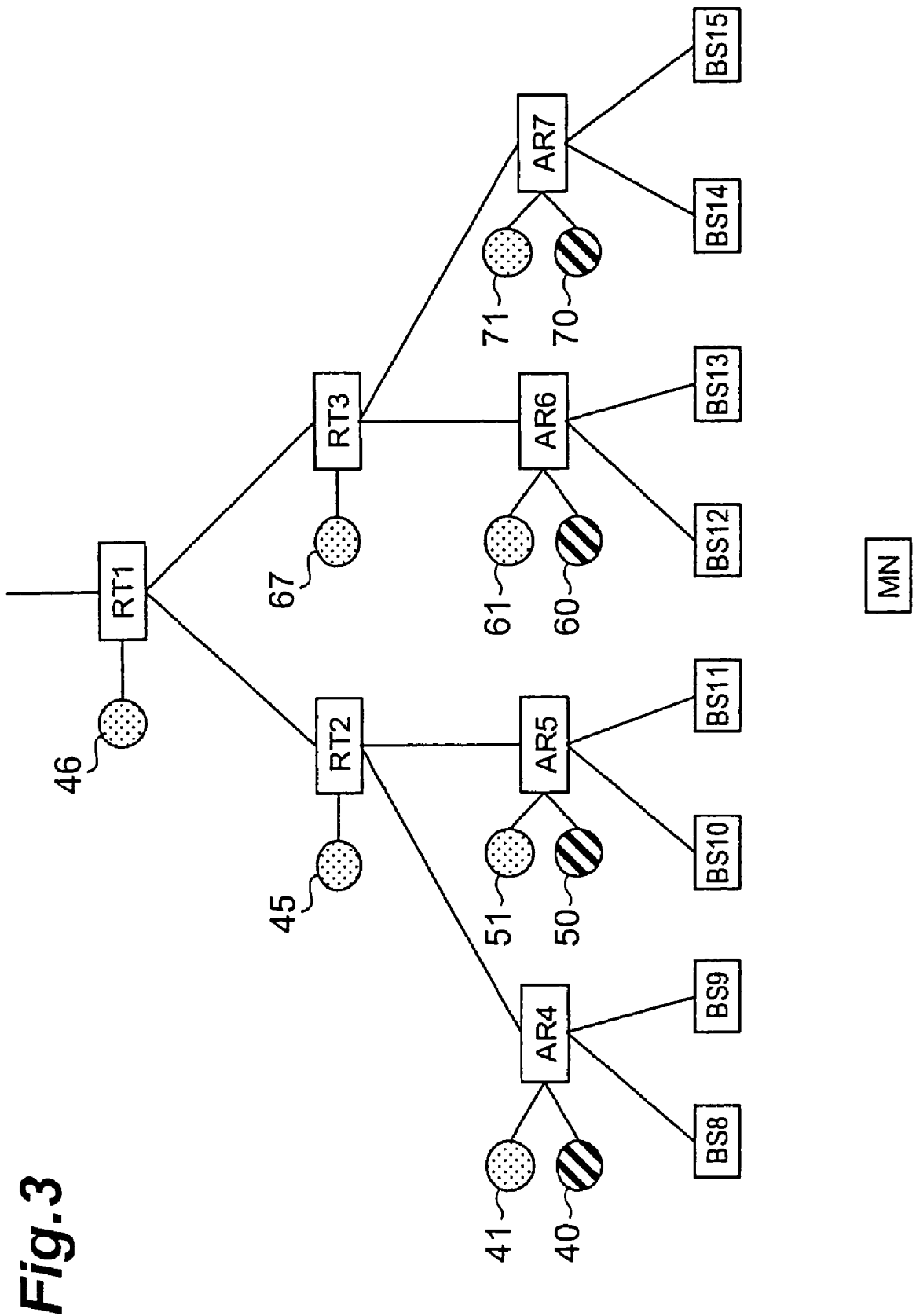
FIG. 3 is an illustration showing an architecture of a mobile communication network in the present invention.

First, an architecture of a mobile communication network according to the present invention is shown in FIG. 3.

MN (Mobile Node) represents a mobile terminal, and BS (Base Station) a radio base station to wirelessly communicate with the mobile terminal MN. AR (Access Router) represents a switching device to which base stations BS belong, and RT (Router) a switching device belonging to a core network, except for the foregoing switching devices AR. Individual routers (switching devices) RT and access routers (switching devices) AR will be denoted with additional numbers, as RT1, RT2, RT3, AR4, AR5, AR6, and AR7.

Routers RT2, RT3 are star-connected to router RT1 located on the core network side, access routers AR4, AR5 are star-connected to router RT2, and access routers AR6, AR7 are star-connected to router RT3. Base stations BS8, BS9 are star-connected to access router AR4, base stations BS10, BS11 are star-connected to access router AR5, base stations BS12, BS13 are star-connected to access router AR6, and base stations BS14, BS15 are star-connected to access router AR7.

C-Plane servers (control signal terminating server devices) 40, 50, 60, and 70 are server devices for terminating a protocol for transmission/reception of a control signal for the soft handover control, i.e., C-Plane protocol (RRC), and are connected to the respective access routers AR4, AR5, AR6, and AR7. Each AR is a router accommodating BSs, and BSs are connected in the star topology from an AR. ARs and RTs are preferably connected in the star (or tree) topology, but the connection relation of these may be the mesh topology or the like.

U-Plane servers 41, 51, 61, 71, 45, 67, and 46 are server devices for terminating U-Plane protocols and performing transactions for soft handover on data (copy of data and assembly and concatenation of data), are connected to the respective routers AR4, AR5, AR6, AR7, RT2, RT3, and RT1.

Although the present embodiment adopts the scheme wherein the routers RT and access routers AR are assumed to be devices for exchange of data only and wherein the C-Plane servers and U-Plane servers are connected as separate nodes to the routers RT and access routers AR, the object of the present invention can also be achieved by a scheme in which they are physically integrated, without having to be limited to the above scheme.

Terminal endpoints of the U-Plane and C-Plane protocols and destinations thereof in the architecture according to the present embodiment will be described below step by step from a point of a start of a communication of the mobile terminal MN.

Figure 4:
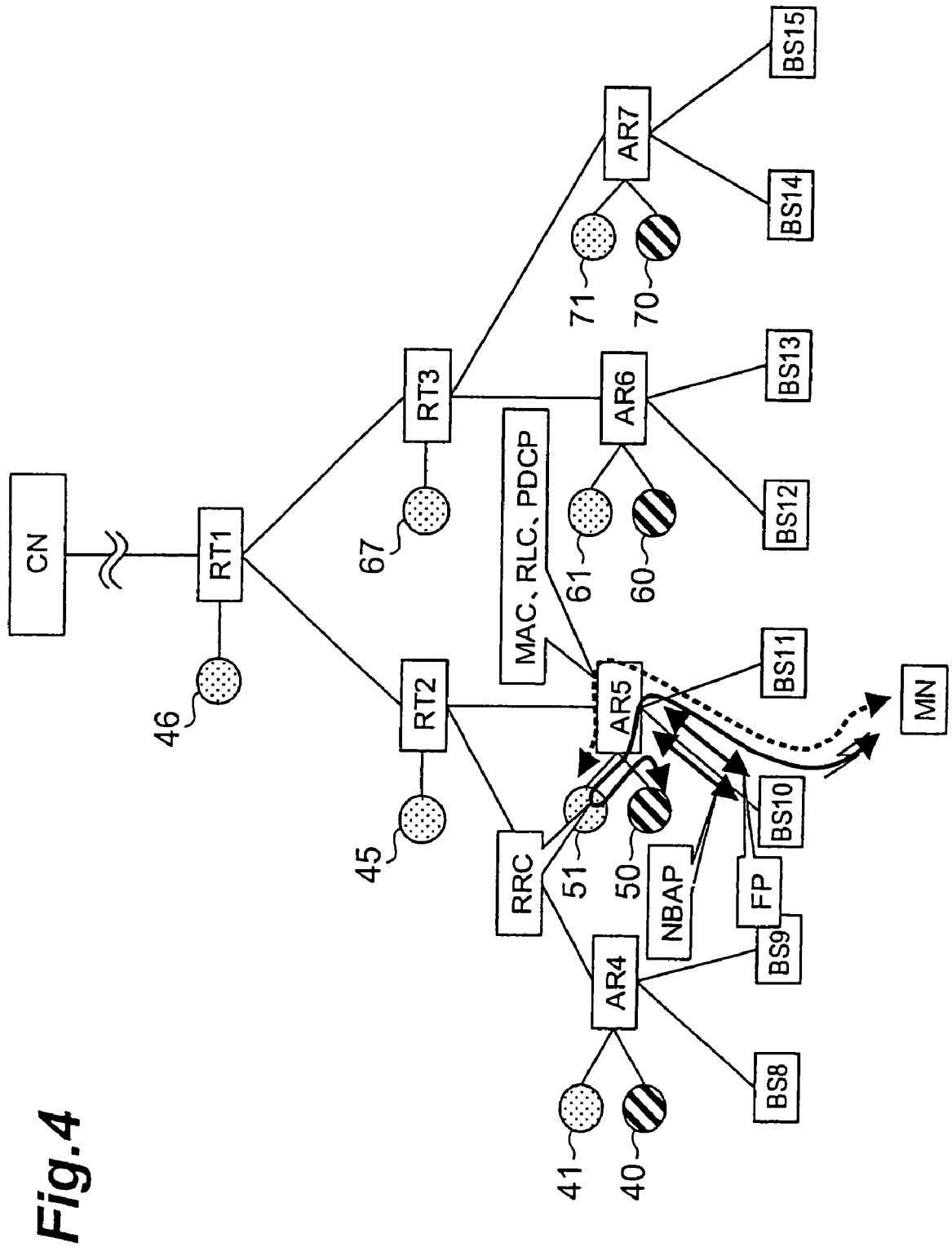
FIG. 4 is an illustration for explaining terminal endpoints of protocols at a time of a start of a communication of a mobile terminal in the present invention.

FIG. 4 is a block diagram for explaining a state in which the mobile terminal MN has connected a branch to BS10 and started a communication.

CN (Correspondent Node) represents a communication partner of the mobile terminal MN. At a start of the communication the mobile terminal MN establishes an RRC connection with one C-Plane server, and in the case of this illustration, the mobile terminal MN has established an RRC connection with the C-Plane server 50 connected to the access router AR5 which is an access router in an area to which the mobile terminal MN belongs.

The U-Plane protocols can be terminated at a U-Plane server connected to any one of routers RT/access router AR existing on a routing path from the correspondent terminal CN to the mobile terminal MN, and in this example, the U-Plane protocols in this case are terminated at the U-Plane server 51 connected to the access router AR5, for reasons such as (1) the transactions on the U-Plane data are specialized to the radio technology and are desired to be handled at a site closer to a radio section; and (2) in view of interaction between the C-Plane server and the U-Plane server, it is desirable to terminate the U-Plane protocols at a site closer to the terminal endpoint of C-Plane (RRC connection).

From the above consideration, concerning both U-Plane and C-Plane, a node corresponding to the SRNC in the UMTS is the access router AR5. At this point, the mobile terminal is not in a soft handover state yet, and there is no node corresponding to the DRNC. Therefore, the RNSAP is not used. From the above, when the terminal endpoints of the respective protocols are set as in the following connections, transmission/reception of data is normally carried out. Each protocol is terminated in each connection according to the following relocation conditions for the terminal endpoints of protocols.

(*) U-Plane Protocols

Concerning the transmission/reception of U-Plane data, FP is used for connection between the U-Plane server 51 of access router AR5 and the base station BS10. MAC, RLC, and PDCP are used for connection between the mobile terminal MN and the U-Plane server 51 of access router AR5.

The U-Plane data is flowing via a route of the correspondent terminal CN, router RT1, router RT2, access router AR5, U-Plane server 51 of access router AR5, access router AR5, base station BS10, and mobile terminal MN (not shown).

(*) C-Plane Protocols

Concerning the transmission/reception of C-Plane data, FP is used for connection between the U-Plane server 51 of access router AR5 and the base station BS10. MAC and RLC are used for connection between the mobile terminal MN and the U-Plane server 51 of access router AR5. RRC is used for connection between the mobile terminal MN and the C-Plane server 50 of access router AR5 via the U-Plane server 51 of access router AR5. Namely, the C-Plane server 50 is a server device for terminating RRC. NBAP is used for connection between the U-Plane server 51 of access router AR5 and the base station BS10.

The C-Plane data (data of RRC) is flowing via a route of the C-Plane server 50 of access router AR5, access router AR5, U-Plane server 51 of access router AR5, access router AR5, base station BS10, and mobile terminal MN (not shown).

The reason why the RRC connection is routed via the U-Plane server 51 of access router AR5 is that the processing load on the C-Plane server 50 is reduced by terminating the MAC and RLC common to the C-Plane and U-Plane at the U-Plane server 51 only.

Since MAC, RLC, and PDCP (which is for U-Plane only) require control by RRC, a protocol for interaction (hereinafter referred to as a "new (communication) protocol") is terminated between a terminal endpoint of RRC (in this case, the C-Plane server 50 of access router AR5) and a terminal endpoint of the MAC.RLC (.PDCP) protocols (in this case, the U-Plane server 51 of access router AR5).

At the U-Plane sever 51, the U-Plane data and C-Plane data are converted from a data format for transmission in a wired network to a data format for transmission in a radio section (and vice versa) (reference is made to the "network distributed soft handover control" as will be described below).

The U-Plane servers are connected to the respective routers RT1, RT2, RT3 and access routers AR4, AR5, AR6, AR7, but do not have to be connected to all of them. The C-Plane servers are connected to the access routers AR4–AR7 only, and the reason for it will be described later.

Figure 5:
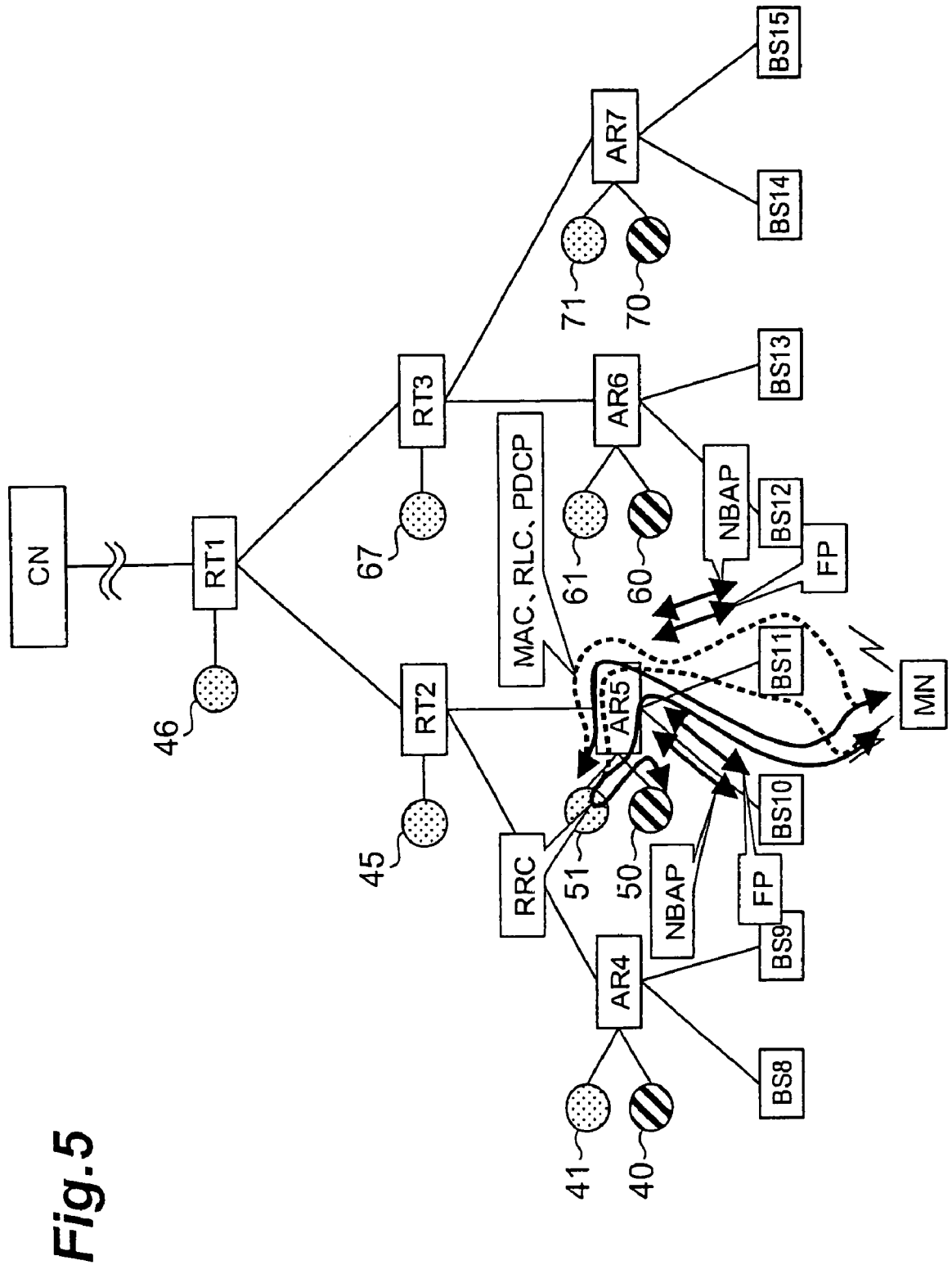
FIG. 5 is an illustration for explaining terminal endpoints of protocols at a time of addition of one branch by the mobile terminal in the present invention.

FIG. 5 is a block diagram for explaining a state in which the mobile terminal MN is in communication while connecting an additional branch to the base station BS11, from the state shown in FIG. 4.

A switching device as an optimal data branch/coupling point at this time is the access router AR5. This point will be called MP (Multipath Point). In the case of FIG. 4, no branch of data is effected, but it can be said from the viewpoint of performing the control of conversion of data format or the like that the access router AR5 was an MP in this case.

Since the location of MP is not changed on the occasion of the transition from the state of FIG. 4 to the state of FIG. 5, there is no change in the terminal endpoints of the protocols, except for addition of FP and NBAP to the interval between the U-Plane server 50 of access router AR5 and the base station BS11.

From the comparison with the flow of data in FIG. 4, the flow of U-Plane data herein is different therefrom in that the data between the U-Plane server 50 of access router ARS and the mobile terminal MN is transmitted through two branches via the access router AR5 and base station BS10 and via the access router AR5 and base station BS11 (not shown). From the comparison with the flow of data in FIG. 4, the flow of C-Plane data (RRC data) herein is different likewise in that there are two branches between the U-Plane server 50 of access router AR5 and the mobile terminal MN.

Figure 6:
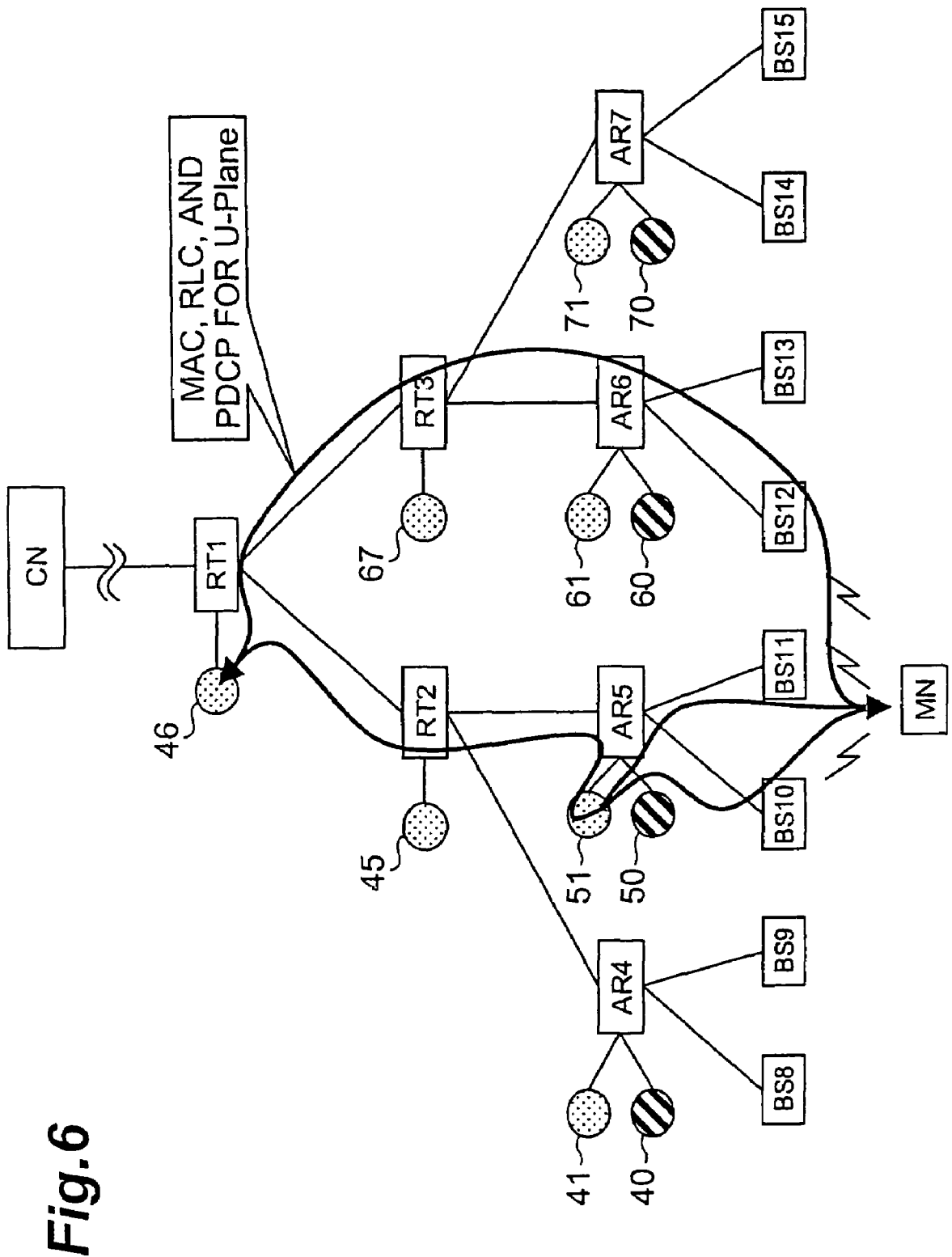
FIG. 6 is a block diagram for explaining a state in which, from the state shown in FIG. 5, the mobile terminal MN added a branch to a base station BS12 and is in communication by U-Plane protocols.
Figure 7:
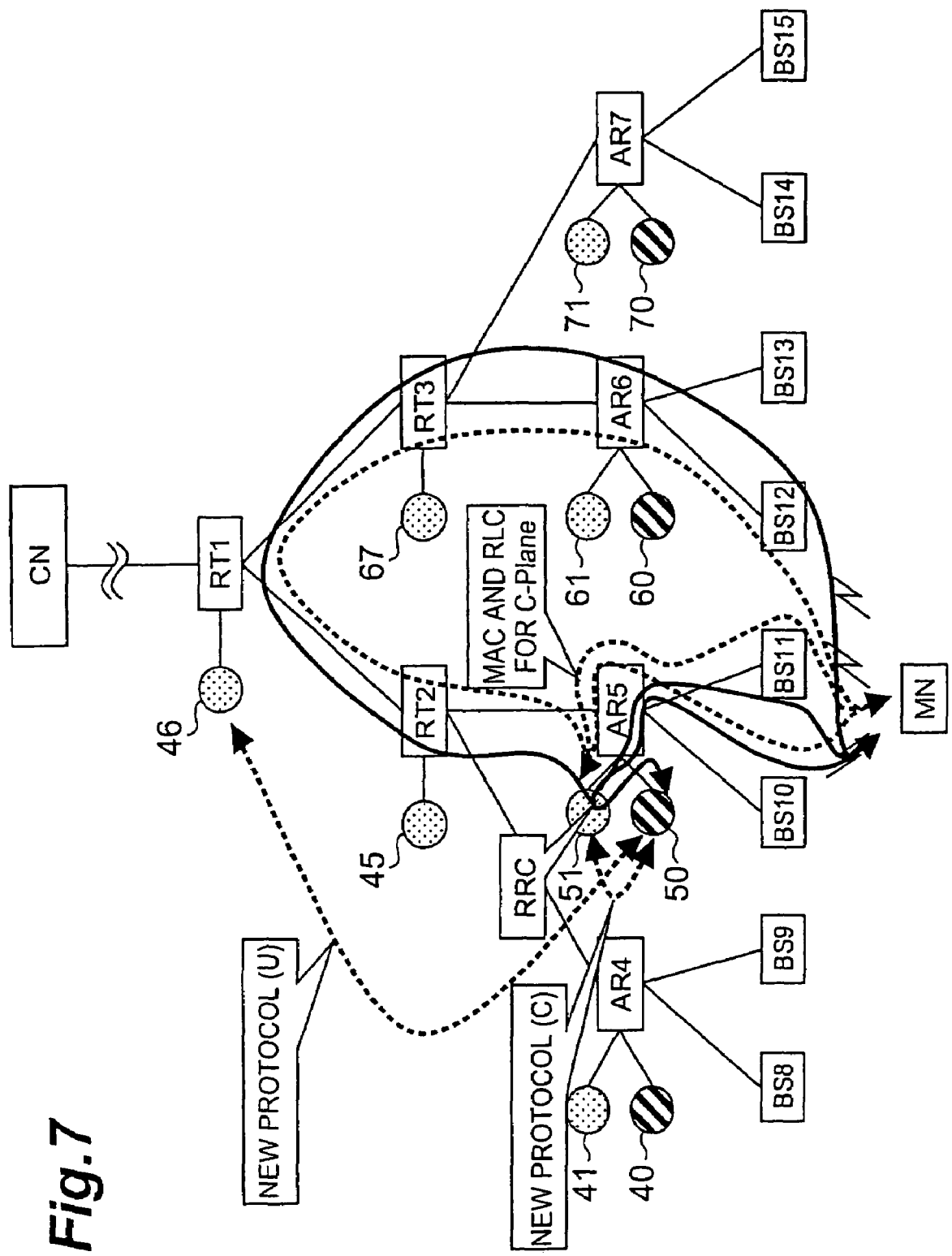
FIG. 7 is a block diagram for explaining a state in which, from the state shown in FIG. 5, the mobile terminal MN added a branch to a base station BS12 and is in communication by C-Plane protocols.

FIG. 6 is a block diagram for explaining a state in which, from the state shown in FIG. 5, the mobile terminal MN added a branch to the base station BS12 (a base station belonging to a different access router) and is in communication by the U-Plane protocols. FIG. 7 is a block diagram for explaining a state in which, from the state shown in FIG. 5, the mobile terminal MN added a branch to the base station BS12 and is in communication by the C-Plane protocols.

Namely, in the mobile communication network composed of a plurality of base stations BS10, BS11, and BS12 connected to a plurality of access routers, the mobile terminal to wirelessly communicate with the base stations is in a state of communication by a soft handover. In this case, the MP: router (access router) as a branch/combining point of data on the communication route is changed and on this occasion, the terminal endpoints of the protocols for the soft handover control are relocated.

MPs to realize an optimal routing path in this case are the router RT1 and access router ARS. When there exist a plurality of MPs as in this case, an MP located at an uppermost point on the route will be referred to as an upper MP, and each (downstream) MP except for it as a lower MP. In this case, the router RT1 is the upper MP, and the access router AR5 the lower MP. Cases with only one MP as in FIG. 5 can be considered to be cases where the MP is the upper MP and there is no lower MP.

The functionality of this U-Plane server is well known, is the same as ME (multipath entity) described in "Network Systems Society of THE INSTITUTE OF ELECTRONICS, INFORMATION AND COMMUNICATION ENGI-NEERS, Technical Report Vol. 102, No. 692, pp323–326," and is used in the network distributed soft handover. The U-Plane server (ME) will be described below.

In the network distributed soft handover control, each MP executes a soft handover control which is executed at the SRNC in the UMTS. In the network distributed soft handover control, soft handover controls used to be centrally handled at the SRNC are decentralized to be handled at a plurality of MPs, and the controls at the respective MPs are shared as follows.

(*) Processing of Downlink Data (1) Processing of Downlink Data at ME (e.g.: U-Plane Server 46) of Upper MP This processing is carried out by sequentially executing steps 1 to 3 below.

1. An IP (Layer 3) packet received from the core network is divided into radio layer 2 frames.

2. The frames are provided with respective sequence numbers (corresponding to CFNs (Connection Frame Numbers) in the UMTS) of the frame protocol and this group of frames are copied by the number of destinations (for RT2 and RT3).

3. The frames are provided with respective IP headers (IP encapsulation) and transmitted to the destinations (RT2 and RT3).

(2) Processing of Downlink Layer at ME (e.g.: U-Plane Server 51) of Lower MP This processing is carried out by sequentially executing steps 1 and 2 below.

1. Data received from the upper MP (RT1) is copied by the number of destinations (BS10 and BS11).

2. The destination of each IP header is changed to either of the above destinations (BS10 and BS11) and transmission is carried out.

(3) Processing of Downlink Layer at Destination Access Routers (e.g.: BS10 and BS11)

At the destination access routers the frames are IP decapsulated and the radio layer 2 frames are transmitted to the mobile terminal MN.

(*) Arrival Synchronization Control of Downlink Data

The synchronization control executed between the SRNC and the Node B in the UMTS is applied to between MPs and to between an MP and an access router (access point).

This processing is carried out by sequentially executing steps 1 to 3 below.

1. The ME of each MP measures a transmission delay from the access router and a delay of frame timing. However, if there exists another MP in this section, the ME measures a transmission delay from the foregoing MP and a delay of frame timing. For example, it measures a response time to transmitted data during a communication with an adjacent router.

2. The measured information is transmitted so as to be aggregated at the upper MP, the transmission timing to downstream and the reception timing from upstream at each MP and access router are determined so as to nullify the delays, and each MP and access router are notified of them.

3. When each access router or lower MP detects a delay of reception timing, it notifies a right upper MP of the delay, and the MP receiving it corrects the transmission timing.

(*) Processing of Uplink Data

Radio layer 2 frames from the mobile terminal MN are IP encapsulated at the access router and transmitted to a lower MP or upper MP.

Processing at ME (e.g.: U-Plane server 51) of Lower MP

This processing is carried out by sequentially executing steps 1 and 2 below.

1. Received data is IP decapsulated and radio layer 2 frames of the same sequence numbers are selected and combined. Namely, each set of frames with an identical sequence number are selected and combined.

2. The radio layer 2 frames after the selection and combining process are again IP encapsulated and transmitted to the upper MP.

Processing at ME (e.g.: U-Plane Server 46) of Upper MP

This processing is carried out by sequentially executing steps 1 to 3 below.

1. Received data is decapsulated and the selection and combining process is carried out.

2. An automatic repeat request (Auto-repeat Request: ARQ) is executed with respect to the mobile terminal MN as occasion demands.

3. Radio layer 2 frames after completion of the selection and combining process (and ARQ) are reassembled into an IP packet, and this IP packet is transmitted to the correspondent terminal (node) CN of the mobile terminal MN.

For switching between MPs during a communication, first, hops between routers, of transmitted data in an IP packet are counted and a route information table of data transmission is created. In the route information table, routes are compared in order from the first hop and a point passing at a hop immediately before discovery of a route passing another different router is determined to be an MP. A combination of MPs to minimize the hop count is selected among the routes in the communication and IP headers of transmitted/received data are changed so as to pass the selected route.

The processing such as the data format conversion to U-Plane data should be carried out at the upper MP, as described in the aforementioned network distributed soft handover control. Therefore, each of the protocols of MAC, RLC, and PDCP of U-Plane in this case is terminated at the mobile terminal MN and at the U-Plane server of the upper MP, i.e., the U-Plane server 46 of router RT1. At the U-Plane server 51 of access router AR5 being a lower MP, MAC and RLC are not terminated, and the copying process of data (downlink data) and the selection and combining process (uplink data) are carried out.

Concerning the C-Plane, there is no change of the branch point (MP for C-Plane) on the C-Plane route due to the change of the routing path between the mobile terminal MN and the C-Plane server 50 in this case. Access router AR5 being a lower MP of U-Plane is a DRNC equivalent in U-Plane.

Since the U-Plane and C-Plane are controlled independently of each other in this manner, separate controls for C-Plane and for U-Plane are needed for the RNSAP, NBAP, and new protocol, as in the FP case.

Hereinafter, the protocols for C-Plane will be referred to as RNSAP(C), NBAP(C), and new protocol (C), and the protocols for U-Plane as RNSAP(U), NBAP(U), and new protocol (U). Although these protocols are also present in each of the cases of FIG. 4 and FIG. 5, they are omitted for convenience' sake of description.

The router RT1 and access router AR5 are an upper MP and a lower MP, respectively, "for U-Plane," the access router AR5 is still the upper MP "for C-Plane", and no lower MP "for C-Plane" exists in this case. It is assumed that an MP includes a router, and each server connected to the router.

From the above, the normal communication can be continued in this case by setting the terminal endpoints of the respective protocols as described below. According to the following relocation conditions for the terminal endpoints of the protocols, the protocols are terminated in each connection.

(1) U-Plane Protocols (FIG. 6)

FP is used to connect the route between the U-Plane server 46 of router RT1 (upper MP) and the U-Plane server 51 of access router AR5 (lower MP), the route between the U-Plane server 46 of router RT1 and the base station BS12, the route between the U-Plane server 51 of access router AR5 and the base station BS10, and the route between the U-Plane server 51 of access router AR5 and the base station BS11.

RLC, MAC, and PDCP are used to connect the route between the mobile terminal MN and the U-Plane server 46 of router RT1.

(2) C-Plane Protocols (FIG. 7)

FP is used to connect the route between the U-Plane server (upper MP for C-Plane) 51 of access router AR5 and the base station BS10, the route between the U-Plane server 51 of access router AR5 and the base station BS11, and the route between the U-Plane server 51 of access router AR5 and the base station BS12.

MAC and RLC are used to connect the route between the mobile terminal MN and the U-Plane server 51 of access router AR5.

RRC is used to connect the route from the mobile terminal MN via the U-Plane server 51 of access router AR5 to the C-Plane server 50 of access router AR5.

RNSAP(C) is not used because there is no lower MP for C-Plane.

RNSAP(U) is used to connect the route between the U-Plane server (upper MP for U-Plane) 46 of router RT1 and the U-Plane server (lower MP for U-Plane) 51 of access router AR5.

NBAP(C) is used to connect the routes from the U-Plane server (upper MP for C-Plane) 51 of access router AR5 to the base station BS10, base station BS11, and base station BS12.

NBAP(U) is used to connect the route between the U-Plane server (upper MP for U-Plane) 46 of router RT1 and the base station BS12, and the routes from the U-Plane server (lower MP for U-Plane) 51 of access router AR5 to the base station BS10 and base station BS11.

New protocol (C) is used to connect the route between the C-Plane server (terminal endpoint of RRC) 50 of access router AR5 and the U-Plane server (upper MP for C-Plane) 51 of access router AR5.

New protocol (U) is used to connect the route between the C-Plane server (terminal endpoint of RRC) 50 of access router AR5 and the U-Plane server (upper MP for U-Plane) 46 of router RT1.

By moving the terminal endpoints of the protocols to the locations as described above, it becomes feasible to relocate the MP (branch/combining point) in conjunction with movement of the mobile terminal MN (or to continue the normal communication). This enables the normal communication to be continued even with the relocation of the MP, whereby redundancy of the routing path can be eliminated.

Next, an arrangement of C-Plane servers will be described.

Figure 8:
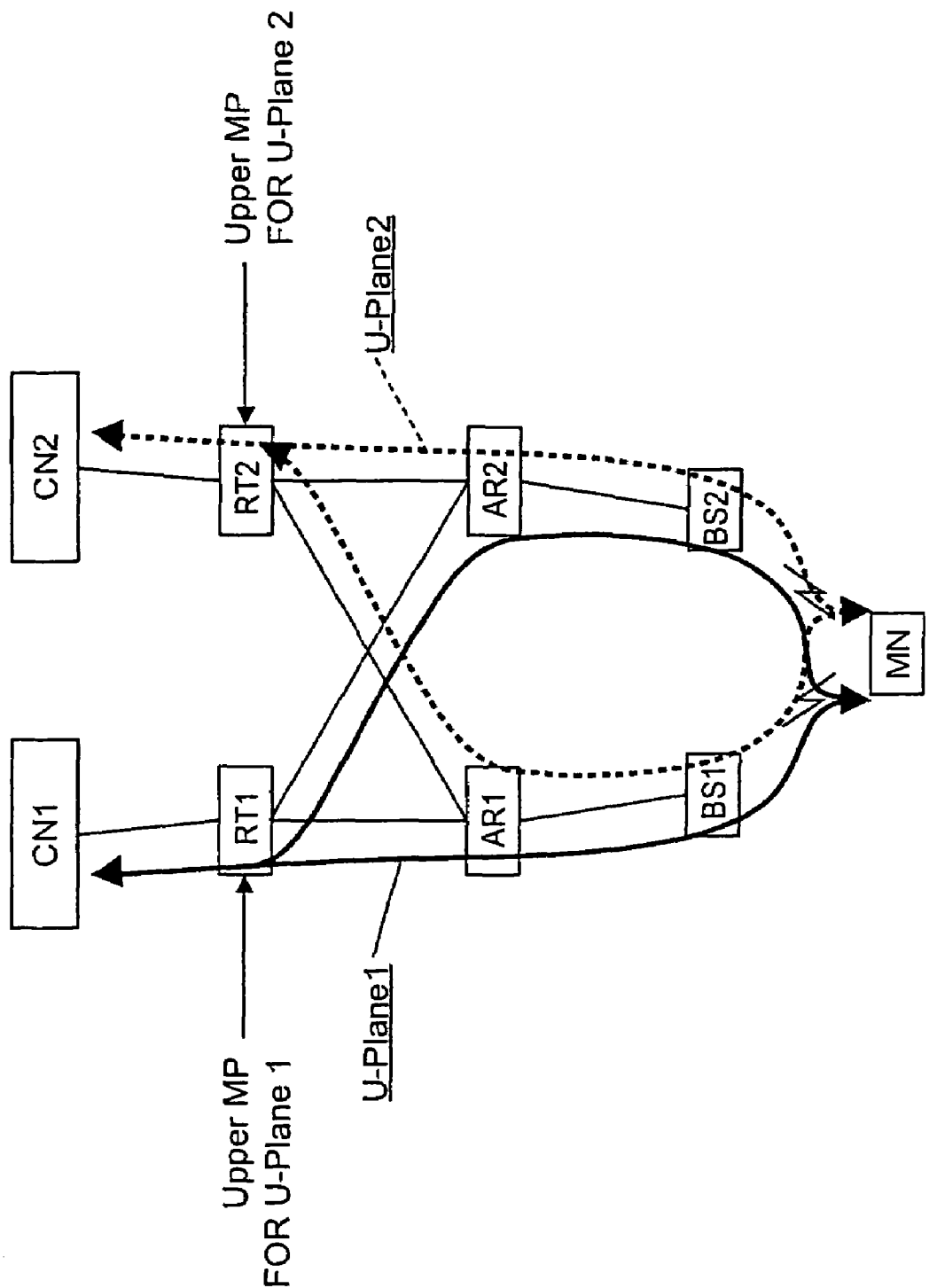
FIG. 8 is a block diagram for explaining C-Plane terminal endpoints during multi-calls.

FIG. 8 is a block diagram for explaining the terminal endpoints of C-Plane during multi-calls. In the aforementioned network, the C-Plane servers 40, 50, 60, and 70 were placed at the respective access routers AR4, AR5, AR6, and AR7 only (cf. FIGS. 3 to 7). The reason for it is as follows.

First, it can be contemplated that the terminal locations of C-Plane are set to be the same as those of U-Plane as in the UMTS case. In that case, the following problem will arise. Namely, where the mobile terminal MN is in simultaneous communications with two (or more) correspondent terminals CN1, CN2 at different locations (which will be called multi-calls), upper MPs for U-Plane can appear at different locations for the communications with the respective correspondent terminals CN1, CN2, depending upon the locations of the correspondent terminals CN1, CN2 and the topology of the network.

The upper MP for U-Plane on the connection route between the mobile terminal MN and the correspondent terminal CN1 is router RT1, while the upper MP for U-Plane on the connection route between the mobile terminal MN and the correspondent terminal CN2 is router RT2.

In this case, it is not surely determined which upper MP should be selected to terminate the C-Plane. For this reason, the terminal endpoints of C-Plane should be set independently of the terminal endpoints of U-Plane. Here, the controls by C-Plane (RRC) also include controls on radio links, such as management of radio resources, and it is thus desirable to terminate the C-Plane at a site close to a radio link, instead of the interior of the network. It is thus considered from this aspect that the C-Plane should be terminated at a location of an access router AR being a node to aggregate the base stations. Therefore, the C-Plane servers should be located at access routers AR only.

Next, switching (relocation) of the terminal endpoints of C-Plane (RRC connection) will be described.

It is conceivable as to the C-Plane (RRC connection) that the C-Plane server used at a start of a communication is continuously used up to an end of the communication. It is, however, considered that, where movement of the mobile terminal MN (soft handover) results in leaving no branch under the C-Plane server (e.g., a case where movement of the mobile terminal MN to the right in FIGS. 6 and 7 results in leaving no branch to the base station BS10 and to the base station BS11 but leaving only branches to the base station BS12 and to the base station BS13), the terminal endpoints are appropriately relocated (e.g., to the C-Plane server 60 of access router AR6). It can be expected that the relocation shortens the routing path of C-Plane and reduces the distance to the U-Plane MP (a routing path for signals of the new protocol).

Figure 9:
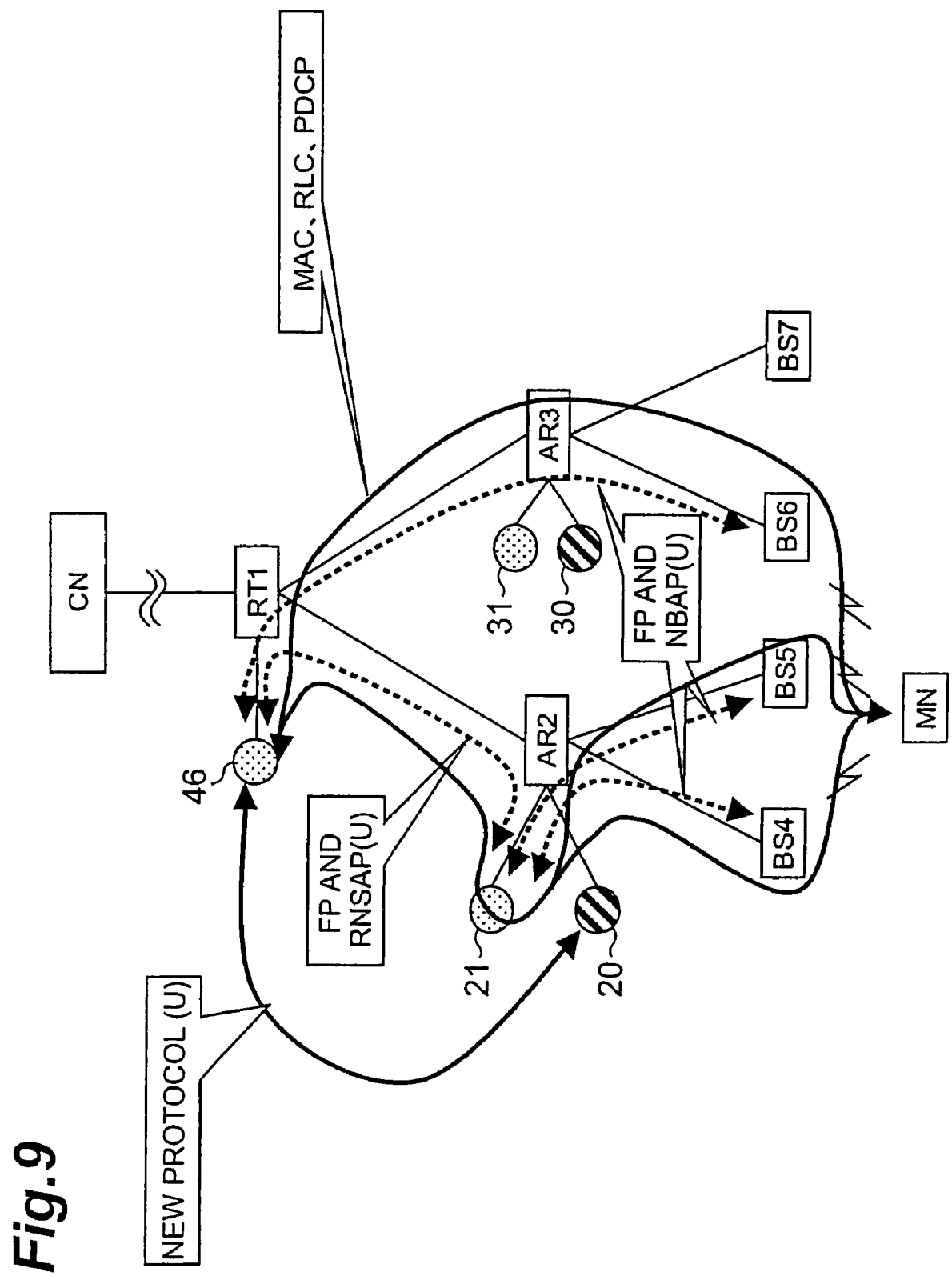
FIG. 9 is an illustration showing terminal endpoints of U-Plane protocols on an architecture in the present invention.
Figure 10:
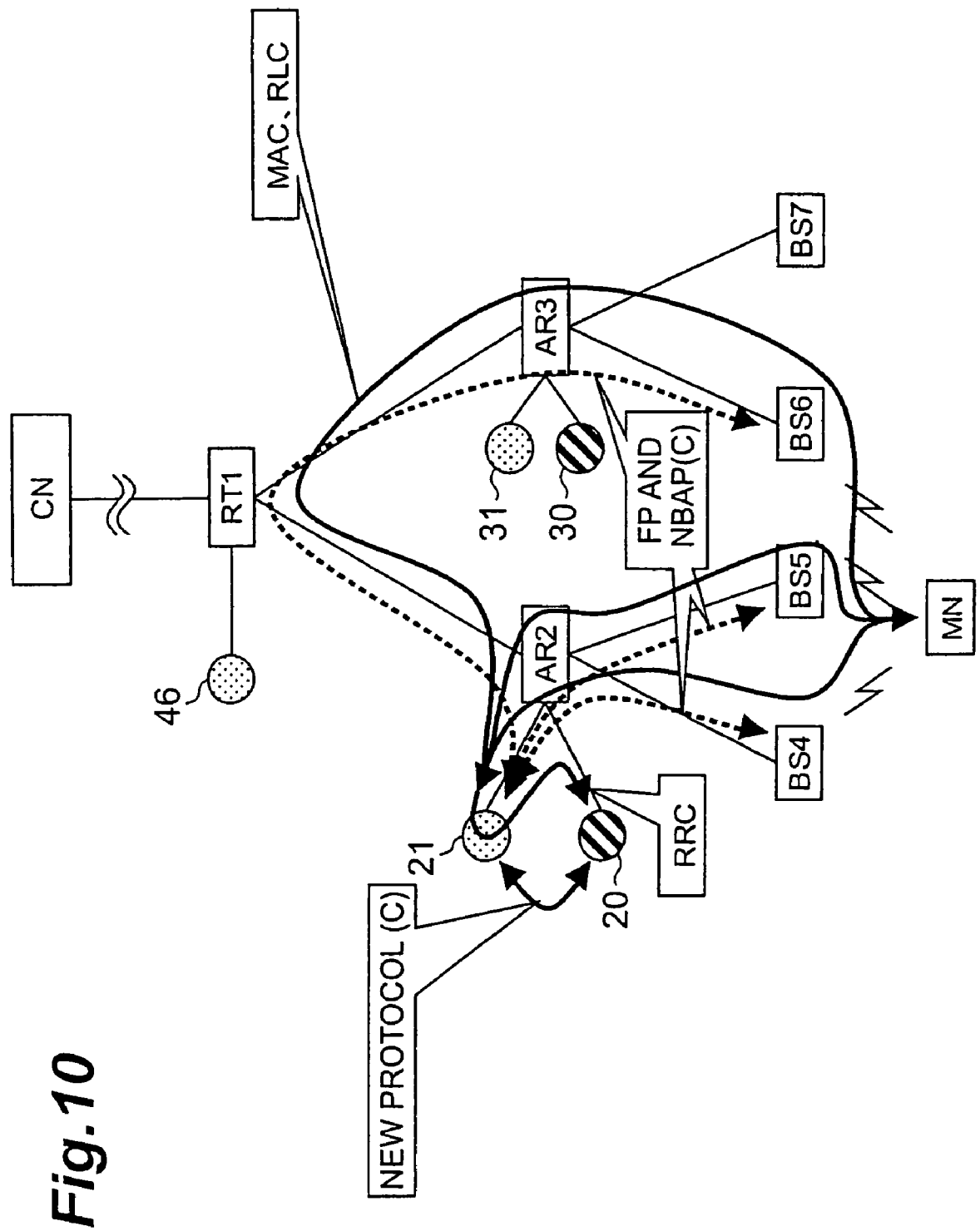
FIG. 10 is an illustration showing terminal endpoints of C-Plane protocols on an architecture in the present invention.

FIG. 9 is an illustration showing the terminal endpoints of the U-Plane protocols on an architecture according to the present invention. FIG. 10 is an illustration showing the terminal endpoints of the C-Plane protocols on the architecture according to the present invention.

A router RT1 is connected to a correspondent terminal CN, access routers AR2, AR3 are star-connected to the router RT1, base stations BS4, BS5 are star-connected to the access router AR2, and base stations BS6, BS7 are star-connected to the access router AR3. A U-Plane server 46 is connected to the router RT1, a C-Plane server 20 and a U-Plane server 21 are connected to the access router AR2, and a C-Plane server 30 and a U-Plane server 31 are connected to the access router AR3.

The terminal endpoints of the respective protocols in the states of FIG. 9 and FIG. 10 are summarized as follows. Each of the protocols is terminated in the following connections according to the following relocation conditions for the terminal endpoints of the protocols.

An upper MP and a lower MP for U-Plane will be referred to as an upper MP(U) and a lower MP(U), respectively, and an upper MP and a lower MP for C-Plane as an upper MP(C) and a lower MP(C), respectively.

(1) U-Plane Protocols (FIG. 9)

FP is used to connect the route between the U-Plane server 46 of the upper MP(U) and the base station BS6, the route between the U-Plane server 46 of the upper MP(U) and the U-Plane server 21 of the lower MP(U), a route between the U-Plane server 21 of the lower MP(U) and a U-Plane server of a lower MP(U) (in a case where there exist a plurality of lower MPs(U): another lower MP(U)), and the routes from the U-Plane server 21 of the lower MP(U) to the base stations BS4, BS5. This is the condition for protocol connections and, if there exists no other lower MP(U), it is a matter of course that no pertinent protocol exists and no termination is made.

MAC, RLC, and PDCP are used to connect the route between the mobile terminal MN and the U-Plane server 46 of the upper MP(U).

(2) C-Plane Protocols (FIG. 10)

FP is used to connect the routes from the U-Plane server 21 of the upper MP(C) to the base stations BS4, BS5, and BS6, a route between the U-Plane server of the upper MP(C) and a U-Plane server of a lower MP(C) (in a case where there exists a lower MP (C): another lower MP(C)), a route between a U-Plane server of a lower MP(C) and a U-Plane server of another lower MP(C) (in a case where there exist a plurality of lower MPs (C)), and a route between a U-Plane server of a lower MP(C) and a base station BS (in a case where there exists a lower MP(C)). This is the condition for protocol connections, and, where there exists no other lower MP(C), it is a matter of course that no pertinent protocol exists and no termination is made.

MAC and RLC are used to connect the route between the mobile terminal MN and the U-Plane server 20 of the upper MP(C).

RRC is used to connect the route from the mobile terminal MN via the U-Plane server 21 of the upper MP(C) to the C-Plane server 20.

RNSAP(C) is used to connect a route between the U-Plane server 21 of the upper MP(C) and a U-Plane server of a lower MP(C) (in a case where a lower MP(C) exists), and a route between a U-Plane server of a lower MP(C) and a U-Plane server of another lower MP(C) (in a case where there exist a plurality of lower MPs(C)).

RNSAP(U) is used to connect the route between the U-Plane server 46 of the upper MP(U) and the U-Plane server 21 of the lower MP(U), and a route between the U-Plane server 20 of the lower MP(U) and a U-Plane server of a lower MP(U) (in a case where there exist a plurality of lower MPs(U)) (FIG. 9).

NBAP(C) is used to connect the routes from the U-Plane server 20 of the upper MP(C) to the base stations BS4, BS5, and BS6 and a route between a U-Plane server of a lower MP(C) and a base station BS (in a case where a lower MP(C) exists).

NBAP(U) (FIG. 9) is used to connect the route between the U-Plane server 46 of the upper MP(U) and the base station BS6 and the routes between the U-Plane server 21 of the lower MP(U) and the BS base stations BS4, BS5.

New protocol (C) is used to connect the route between the C-Plane server 20 and the U-Plane server 21 of the upper MP (C).

New protocol (U) (FIG. 9) is used to connect the route between the C-Plane server 21 and the U-Plane server 46 of the upper MP (U)

For changing the location of MP with movement of the mobile terminal MN, the terminal endpoints of the protocols can be relocated along the above criteria. Namely, since the location of MP can be changed along the above-described protocol termination conditions, the communication can be continued without trouble in spite of the relocation of MP, and, therefore, a redundant routing path can be eliminated.

Namely, the above-described mobile communication network is a mobile communication network comprising a plurality of switching devices RT1–RT3, AR4–AR7 and a plurality of base stations BS8–BS15 (BS4–BS7) connected to the switching devices AR4–AR7, the mobile communication network comprising changing means (U-Plane server 21) for, while a mobile terminal MN to wirelessly communicate with the base stations BS8–BS15 (BS4–BS7) is in a communication by a soft handover, changing a switching device to another AR5, RT1 as a branch/combining point of data on a communication route of the communication; and protocol terminal endpoint relocating means for relocating a terminal endpoint of a protocol for the soft handover control according to the aforementioned protocol termination conditions, in the changing by the changing means.

In this case, the relocation of the terminal endpoint of the protocol by the protocol terminal endpoint relocating means enables the communication to be maintained in a good condition even with the change of the branch/combining point so as to eliminate a redundant routing path by the changing means. The conditions for the relocation of the protocol terminal endpoints by the protocol terminal endpoint relocating means are as described above, whereby the switching of the routing paths for the control signals with movement of the control point can be made without trouble in the communication.

This protocol terminal endpoint relocating means is a management node (not shown) for managing the entire mobile communication network. This management node is configured, for example, to detect a hop count included in data in transmission, to compare the detected hop count with a minimum hop count stored in a database and preliminarily calculated by analysis of nodes in the network, and to determine that, if the detected hop count is larger than the minimum hop count, a routing path contains a minimum, redundant routing path.

In this case, the management node sets the MP so that data passes through a routing path of the minimum hop count calculated. Thereafter, the management node instructs the network to relocate the MP, whereby the location of the MP is changed. The management node transmits an instruction signal for the relocation of MP to a router or a server, and in accordance with the instruction signal the router gives an address to the data in transmission so as to change the actual MP location.

This instruction contains identifier information of the new and old MPs, so that each router and each server in the network can acknowledge the MPs before and after the relocation. As triggered by this instruction (i.e., the relocation of MP), each router and each server in the network execute the change of the protocol terminal endpoints so as to satisfy the aforementioned protocol termination conditions, based on the information of the instruction contents.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A protocol terminating method in a mobile communication network, the method comprising:
providing a plurality of switching devices and a plurality of base stations in communication wit the switching devices;
initiating a soft handover of a mobile terminal that is in wireless communication with at least two of the base stations; and
during the soft handover, relocating a terminal endpoint of a protocol used to control the soft handover by changing from a first switching device to a second switching device to change a branch/combining point of data on a communication route used by the mobile terminal.

2. The protocol terminating method according to claim 1, wherein changing from the first switching device to the second switching device comprises changing from a lower multipath point on a communication route to an upper multipath point on the communication route that is upstream of the lower multipath point.

3. The protocol terminating method according to claim 1, wherein the protocol comprises a user data protocol and a control signal protocol, and relocating a terminal endpoint of a protocol comprises relocating the user data protocol separately from the control signal protocol.

4. The protocol terminating method according to claim 1, wherein relocating a terminal endpoint of a protocol comprises relocating a terminal endpoint of a data communication protocol.

5. The protocol terminating method according to claim 3, wherein relocating a terminal endpoint of a data communication protocol comprises maintaining a terminal endpoint of a control signal communication protocol unchanged.

6. The protocol terminating method according to claim 1, wherein relocating a terminal endpoint of a protocol comprises eliminating a redundant routing path from the communication route.

7. The protocol terminating method according to claim 1, wherein relocating a terminal endpoint of a protocol further comprises terminating a frame protocol between the second switching device and a base station, and terminating at least one of a medium access control or a radio link control, or a combination thereof, between the second switching device and the mobile terminal.

8. The protocol terminating method according to claim 7, wherein terminating a frame protocol further comprises terminating the frame protocol between the second switching device and the first switching device, between the first switching device and a third switching device, and between the first switching device and the base station.

9. The protocol terminating method according to claim 7, wherein the protocol is a user data protocol and terminating at least one of a medium access control or a radio link control, or a combination thereof, further comprises terminating a packet data convergence protocol between the second switching device and the mobile terminal.

10. The protocol terminating method according to claim 1, wherein the protocol is a user data protocol, and the first and second switching devices each comprise a respective first and second user information transport plane protocol server.

11. The protocol terminating method according to claim 1, wherein the protocol is a control signal protocol and the first and second switching devices each comprise a respective first and second control signal terminating server.

12. The protocol terminating method according to claim 1, wherein relocating a terminal endpoint of a protocol comprises terminating protocols for transmission/reception of control signals with a control signal terminating server to control the soft handover.

13. The protocol terminating method according to claim 12, wherein terminating protocols for transmission/reception of control signals with a control signal terminating server comprises terminating a radio resource control between the mobile terminal and the control signal terminating server via the second switching device.

14. The protocol terminating method according to claim 1, wherein the protocol comprises a user data protocol and a control signal protocol, and the first and second switching devices each comprise a respective first and second user information transport plane protocol server and a respective first and second control signal terminating server, and where the step of terminating protocols comprises terminating a radio network subsystem application part between each of the first and second user information transport plane protocol servers, and between each of the first and second control signal terminating servers.

15. The protocol terminating method according to claim 14, wherein the step of terminating a radio network subsystem application part further comprises the step of terminating the radio network subsystem application part between the first user information transport plane protocol server and a third user information transport plane protocol server, and between the first control signal terminating server and a third control signal terminating server.

16. The protocol terminating method according to claim 1, wherein the protocol comprises a user data protocol and a control signal protocol, and the first and second switching devices each comprise a respective first and second user information transport plane protocol server and a respective first and second control signal terminating server, and where the step of terminating protocols comprises terminating a base station application part between one of the base stations and each of the first and second control signal terminating servers, and between one of the base stations and each of the first and second user information transport plane protocol servers.

17. The protocol terminating method according to claim 12, wherein terminating protocols for transmission/reception of control signals further comprises the step of terminating a new communication protocol between the control signal terminating server and the second switching device.

18. The protocol terminating method according to claim 17, wherein the second switching device comprises a user information transport plane protocol server and a control signal terminating server, and terminating the new communication protocol comprises terminating the new communication protocol between the control signal terminating server and each of the user information transport plane protocol server and the control signal terminating server.

19. The protocol terminating method according to claim 1, wherein the first switching device is an access router having a group of base stations star connected thereto, and the second switching device is a core network router with the first switching device star connected thereto.

20. A system for terminating protocols for transmission/reception of signals for a soft handover control in a mobile communication network, the system comprising:
a plurality of switching devices and a plurality of base stations in communication with the switching devices;
a mobile terminal configured to wirelessly communicate with the base stations, and
a management node configured to manage the mobile communication network,
wherein when the mobile terminal is involved in a soft handover, the management node is operable to direct the relocation of a terminal endpoint of a protocol far control of the soft handover to change from a first one of the switching devices operable as a branch/combining point of data on a communication route usable by the mobile terminal to a second one of the switching devices that is operable as a branch/combining point of data on to communication route in order to eliminate a redundant routing path.

21. A mobile communication system comprising a plurality of switching devices and a plurality of base stations connected to the switching devices, the mobile communication system comprising:
a user information transport plane protocol server operable to substitute a first switching device operable as a branch/combining point of date on a communication route useable by a mobile terminal for a second switching device operable as a branch/combining point of data on the communication route, wherein the user information transport plane protocol sorver is operable to substitute the first switching device for the second switching device to optimize the communication route while a mobile terminal in communication with at least two of the base stations is subject to a soft handover; and
a management node operable to direct relocation of a terminal point of a protocol useable to control the soft handover in accordance with the substitution of the second switching device for the first switching device.

22. The mobile communication system according to claim 21, wherein the first switching device is an access router, and a group of base stations are star connected to the access router, and the second switching device is a core network router, the access router star connected to the core network router.

23. The mobile communication system according to claim 21, wherein the first switching device is a lower multipath point on the communication route, and die second switching device is an upper multipath point on the communication route that is upstream of the lower multipath point.

24. The mobile communication system according to claim 23, wherein the management node is operable to direct termination of a frame protocol between the second switching device and one of the base stations, between the second switching device and the first switching device, between the first switching device end a third switching device tat is another lower multipath point, and between the first switching device and one of the base stations.

25. The mobile communication system according to claim 24, wherein the management node is operable to direct termination of at least one of a medium access control, or a radio link control, or a combination thereof, between the first switching device and the mobile terminal.

26. The mobile communication system according to claim 25, wherein the protocol is a user data protocol and the management node is further operable to direct termination of a packet data convergence protocol between the second switching device and the mobile terminal.

27. The mobile communication system according to claim 21, wherein the protocol is a user data protocol and the first and second switching devices each comprise a respective first and second user information transport plane protocol server.

28. The mobile communication system according to claim 21, wherein the protocol is a control signal protocol and the first and second switching devices each comprise a respective first and second control signal terminating server.

29. The mobile communication system according to claim 21, wherein the protocol comprises a user data protocol and a control signal protocol, and the management node is operable to direct relocation of the user data protocol separately from relocation of the control signal protocol.

30. The mobile communication system according to claim 21, wherein the protocol comprises a data communication protocol, and the management node is operable to direct relocation of the terminal point of the data communication protocol.

31. The mobile communication system according to claim 30, wherein the protocol further comprises a, control signal communication protocol, and the management node is operable to maintain unchanged the terminal point of the control signal communication protocol.

32. The mobile communication system according to claim 21, wherein the management node is operable to direct relocation of the terminal endpoint of the protocol to eliminate a redundant routing path from the communication route.

33. The mobile communication system according to claim 21, further comprising a control signal terminating server operable to terminate the protocol for transmission/reception of control signals for control of the soft handover.

34. The mobile communication system according to claim 33, wherein the second switching device is at an upper point among a plurality of branch/combining points on a routing path of the control signals and the first switching device is one of the branch/combining points that are at a lower point on the routing path.

35. The mobile communication system according to claim 33, wherein the second switching device is operable to terminate a radio resource control between the mobile terminal and the control signal terminating server via the second switching device.

36. The mobile communication system according to claim 21, wherein the protocol comprises a user data protocol and a control signal protocol, and the first and second switching devices each comprise a respective first and second user information transport plane protocol server and a respective first and second control signal terminating server, and where the management node is further operable to direct termination of a radio network subsystem application part between the first and second user information transport plane protocol servers, and between the first and second control signal terminating servers.

37. The mobile communication system according to claim 36, wherein the management node is further operable to direct termination of the radio network subsystem application part between the first user information transport plane protocol server and a third user information transport plane protocol sewer, and between the first control signal terminating server and a third control signal terminating server.

38. The mobile communication system according to claim 21, wherein the protocol comprises a user data protocol and a control signal protocol, and the first and second switching devices each comprise a respective first and second user information transport plane protocol server and a respective first and second control signal terminating server, and where the management node is further operable to direct termination of a base station application part between one of the base stations and each of the first and second control signal terminating servers, and between the one of the base stations and the first and second user information transport plane protocol servers.

39. The mobile communication system according to claim 33, wherein the protocol comprises a user data protocol and a control signal protocol, and the second switching device comprises a user information transport plane protocol multipath point and a control signal terminating multipath point, and where the management node is further operable to direct termination of a new communication protocol between the control signal terminating server and the control signal terminating multipath point and between the control signal terminating server and the user information transport plane protocol multipath point.

* * * * *

UNITED STATES PATENT AND TRADEMARK OFFICE
CERTIFICATE OF CORRECTION

PATENT NO. : 7,142,859 B2  Page 1 of 1
APPLICATION NO. : 10/929121
DATED : November 28, 2006
INVENTOR(S) : Kenji Nishimura et al.

It is certified that error appears in the above-identified patent and that said Letters Patent is hereby corrected as shown below:

On The Title Page:

Item (75) Inventors
After "Shoichi Hirata", delete "Fuchu" and insert --Tokyo--.

Column 16
Line 8, delete "wit" and insert --with--.

Column 18
Line 7, delete "far" and insert --for--.
Line 13, delete "to" and insert --the--.
Line 21, delete "date" and insert --data--.
Line 25, delete "sorver" and insert --server--.
Line 44, delete "die" and insert --the--.
Line 52, delete "end" and insert -- and--; delete "tat" and insert --that--.

Column 19
Line 19, after "a" and before "control", delete ",".

Column 20
Line 16, delete "sewer" and insert --server--.

Signed and Sealed this

Twenty-seventh Day of February, 2007

JON W. DUDAS
*Director of the United States Patent and Trademark Office*